(12) United States Patent
Blass et al.

(10) Patent No.: US 10,942,893 B2
(45) Date of Patent: Mar. 9, 2021

(54) SYSTEMS AND METHODS FOR A SPECIALIZED COMPUTER FILE SYSTEM

(71) Applicant: Walmart Apollo, LLC, Bentonville, AR (US)

(72) Inventors: Oscar Blass, Bentonville, AR (US); Michele Marie McNully, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 211 days.

(21) Appl. No.: 15/882,357

(22) Filed: Jan. 29, 2018

(65) Prior Publication Data

US 2018/0217998 A1 Aug. 2, 2018

Related U.S. Application Data

(60) Provisional application No. 62/452,224, filed on Jan. 30, 2017.

(51) Int. Cl.
*G06F 16/11* (2019.01)
(52) U.S. Cl.
CPC .................. *G06F 16/125* (2019.01)
(58) Field of Classification Search
CPC .................................................. G06F 16/125
See application file for complete search history.

(56) References Cited

U.S. PATENT DOCUMENTS

| 9,286,644 B2 | 3/2016 | Kulkarni et al. |
| 9,325,775 B2 | 4/2016 | Jitkoff et al. |
| 2011/0191306 A1 | 8/2011 | Akagawa et al. |
| 2012/0016838 A1* | 1/2012 | Arai ............. G06F 16/1844 707/610 |
| 2013/0198521 A1* | 8/2013 | Wu ................. H04L 9/0894 713/175 |
| 2013/0254259 A1 | 9/2013 | Wilson |

(Continued)

FOREIGN PATENT DOCUMENTS

JP 2014170336 A 9/2014

OTHER PUBLICATIONS attachmore, Attachmore Software Overview. Retrieved online at: https://www.attachmore.com/Support/attachmore_software_overview.aspx. 6 pages.

(Continued)

*Primary Examiner* — Van H Oberly
(74) *Attorney, Agent, or Firm* — Fitch, Even, Tabin & Flannery LLP

(57) ABSTRACT

A specialized computer file system for self-managing data storage resources provided as a service to remotely executed applications. The system includes a data storage device configured to store a plurality of data files in a non-relational data store. A storage server is configured to upload a data file to the data storage device to be stored with the plurality of data files. The storage server generate a file link associated with the data file. The storage server transmit the file link to the client application, wherein the client application transmits the file link to an end user. A maintenance server is configured to execute an erase operation to autonomously erase the at least one data file from the data storage device after the data file has been stored in the data storage device for a specified duration of time.

24 Claims, 7 Drawing Sheets

(56) References Cited

U.S. PATENT DOCUMENTS

2015/0012861 A1  1/2015  Loginov
2015/0178310 A1* 6/2015  Fellner .................. G06F 16/16
                                                             711/154
2015/0278243 A1 10/2015  Vincent et al.

OTHER PUBLICATIONS

Crider, How to Share Files and Folders on Microsoft OneDrive. Retrieved online at: http://www.digitaltrends.com/computing/how-to-share-files-and-folders-on-microsoft-onedrive/, 6 pages, Sep. 9, 2015.

Dropbox, Give people view-only access to your files. Retrieved online at: https://www.dropbox.com/en/help/167. 3 pages. Retrieved Nov. 8, 2016.

Rightload, Welcome to Rightload! Retrieved online at: http://rightload.org/index.php/rightload/html. 1 page. Retrieved Nov. 8, 2016.

International Search Report and Written Opinion for Application No. PCT/US2018/015743, dated Mar. 28, 2018. 10 pages.

* cited by examiner

SYSTEMS AND METHODS FOR A SPECIALIZED COMPUTER FILE SYSTEM

CROSS-REFERENCE TO RELATED PATENT APPLICATIONS

This application claims priority to U.S. Provisional Application No. 62/452,224 filed on Jan. 30, 2017, the content of which is hereby incorporated by reference in its entirety.

BACKGROUND

The operation of a file system produces vast quantities of data that need to be stored. To provide the data storage, file systems typically have a storage infrastructure that includes a wide array of storage equipment (physical hardware and memory) and file management software. Typically, the storage equipment and software can be provided by a diverse set of suppliers. Each supplier can have their own management system for their products. Unfortunately, the result is a complex set of storage equipment and software with numerous individual management systems. In a large file system, this type of complex storage infrastructure is difficult and expensive to manage and often results in inefficient use of computing resources in terms of both the use of the physical storage equipment and the use of processor resources to implement the various file management systems.

BRIEF SUMMARY

In one embodiment, a specialized computer file system for self-managing data storage resources provided as a service to remotely executed applications is provided. The system includes a data storage device configured to store a plurality of data files in a non-relational data store. The system also includes a storage server communicatively coupled to the data storage device and a client application. The storage server is configured to receive at least one data file from the client application and to upload the at least one data file to the data storage device to be stored with the plurality of data files. The at least one data file is associated with a file name, which can be modified by the storage server when the data file is uploaded to the data storage device. The storage server is further configured to generate a file link associated with the at least one data file. The file link can include a source path to the at least one data file stored in the data storage device. The storage server is also configured to transmit the file link to the client application, which can transmit the file link to an end user. The at least one data file is retrievable from the data storage device by the end user via the file link. The system further includes a maintenance server communicatively coupled to the data storage device. The maintenance server is configured to execute an erase operation to autonomously erase the at least one data file from the data storage device after the data file has been stored in the data storage device for a specified duration of time.

In another embodiment, a method for self-managing data storage provided as a service to remotely executed applications is provided. The method is implemented via a data storage device configured to store a plurality of data files in a non-relational data store, a storage server communicatively coupled to the data storage device and a client application, and a maintenance server communicatively coupled to the data storage device. The method includes receiving, by the storage server, at least one data file from the client application. The method also includes uploading, by the storage server, the at least one data file to the data storage device to be stored with the plurality of data files. The at least one data file is associated with a file name and the storage server modifies the file name when uploading the at least one data file to the data storage device. The method further includes generating, by the storage server, a file link associated with the at least one data file. The file link includes a source path to the at least one data file stored in the data storage device. The method also includes transmitting, by the storage server, the file link to the client application, which can transmit the file link to an end user. The at least one data file is retrievable from the data storage device by the end user via the file link. The method further includes executing, by the maintenance server, an erase operation to autonomously erase the at least one data file from the data storage device after the data file has been stored in the data storage device for a specified duration of time.

Any combination and/or permutation of embodiments is envisioned. Other embodiments, objects, and features will become apparent from the following detailed description considered in conjunction with the accompanying drawings. It is to be understood, however, that the drawings are designed as an illustration only and not as a definition of the limits of the present disclosure

BRIEF DESCRIPTION OF THE DRAWINGS

The accompanying drawings, which are incorporated in and constitute a part of this specification, illustrate one or more embodiments of the invention and, together with the description, help to explain the invention. The embodiments are illustrated by way of example and should not be construed to limit the present disclosure. In the drawings.

DETAILED DESCRIPTION

Figure 1:
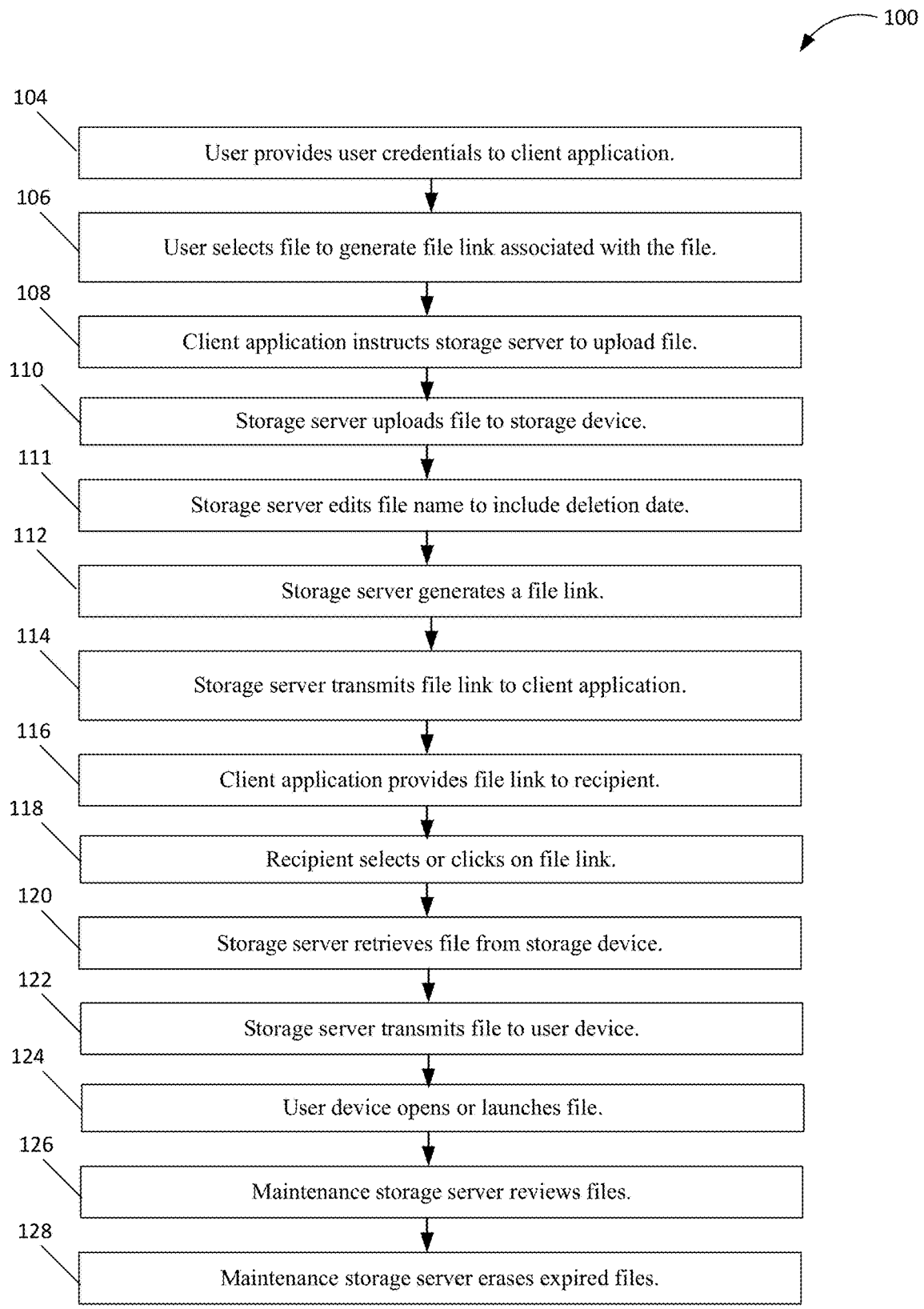
FIG. 1 is a flowchart illustrating an exemplary method for providing self-managing data storage resources provided as a service to a remotely executed application using a specialized computer file system, according to an example embodiment.

Systems, methods, and computer readable mediums are described herein for a specialized computer file system for self-managing data storage resources provided as a service to remotely executed applications. The specialized computer file system includes a storage server (also referred to herein as a file server) configured to receive at least one electronic data file (hereafter, "file") from a remotely executed application (hereafter, "applications" or "client applications") and stores the file in a remotely-located data storage device (hereafter, "storage device"). The storage device stores the file in a non-relational data store. The files stored in the storage device are not stored using a database structure, not indexed, and are incapable of being queried using a query language. The storage server generates a file link associated with the file. In an exemplary embodiment, the file link is in the form of a direct download link (DDL) that references the file on the storage device. The storage server transmits the file link to the client application. The client application may then transmit the file link to a recipient, for example, via an email. In response to receiving the file link, the recipient may view the file by clicking on the file link. For example, where the file link is a DDL, clicking on the link downloads the file to the recipient's computing device. The recipient may access the file using the file link from any computing device; however, the storage device is configured such that the file is only retrievable by users via the file link. The specialized computer file system further includes a maintenance storage server coupled to the storage device. The maintenance storage server is configured to browse the file names of the files stored in the storage device and to delete the file from the storage device based on the file name and/or after a predefined duration of time elapses from when the file was initially stored in the storage device.

In an exemplary embodiment, the storage device is a data storage file system including a file directory and object storage. Files may be added to or deleted from the storage device; however, there is no database and the files are incapable of being edited or updated. The storage device is able to perform simple file operations, such as add and erase. For example, the storage server communicates with the storage device using create/insert/write operations to store files and select/get/read operations to retrieve files. The maintenance storage server communicates with the storage device using erase operations to erase files from the storage device. There are no storage device queries or requests based on the data itself. The storage device can be used as a key-value storage device to insert and retrieve files without any complexities apart from prefixes, which allow collecting similar data under a directory like structure.

It will be appreciated that the storage device does not incorporate restrictions on data being stored, and the storage device is not limited to storing files. The disclosure applied herein equally applies to directories, zip files, and the like. For example, the file link may be in a form of a direct download link (DDL) that references a folder on the storage device that includes, for example, multiple files.

The specialized computer file system described herein enables an application to efficiently store and provide files across multiple machines in any location without requiring any storage by the application. The specialized computer file system further enables the application to transmit large attachments to recipients without needing sufficient storage to store the large attachments. The specialized computer file system enables sharing of large files and sending them to large groups without having to take up storage permanently. The specialized computer file system improves space management and provides the application with easy access to data management. The specialized computer file system is a self-service system for which the application does not require assistance from an administrator or software developer to save or manage files. Additionally, the specialized computer file system improves cybersecurity by preventing the file from being obtained except through the file link. The files are then automatically deleted from the storage system after a predefined duration, for example, thirty days after the file is uploaded. Used internally within a group or an organization, the specialized computer file system enables sharing of files without requiring external access to the internet or requiring a database, and presents little possibility of the files being hacked or stolen.

FIG. 1 is a flowchart illustrating a first exemplary method 100 for providing self-managing data storage resources as a service to a remotely executed application using a specialized computer file system, according to an example embodiment. Method 100 is implemented using a storage server, one or more client applications, a storage device using a non-relational data store, and a maintenance storage server.

At step 104, on a user interface generated on a first user device, a user provides user credentials to a client application installed on the first user device. At step 106, the user selects a file with a request to generate a file link associated with the file. For example, an option to generate the file link may be displayed in the user interface in the form of a control button that can be selected by the user. The user interface may include a control button that when selected or clicked communicates with a client application.

At step 108, the client application communicates the request with the storage server and instructs the storage server to upload the file. In some embodiments, the storage server is associated with an application program interface (API), wherein the client application communicates with the storage server using the API. The client application provides the storage server with the file or the address of the file, such as an Uniform Resource Locator (URL) or web address of the file. At step 110, the storage server uploads the file to the storage device. The file is associated with a file name. At step 111, the storage server edits the file name. For example, the storage server can edit the file name to include a deletion date and/or other information such as an upload date, an alphanumeric marker, and the like. For example, the storage server can add an expiration stamp to the file name associated with a deletion date for the file and/or an upload time stamp, where the deletion date can occur after a predefined duration (i.e., 30 days) from when the file is uploaded to the storage device. In one embodiment, the file is stored in a directory associated with the user credentials. The directory may include previously uploaded files associated with the user credentials and stored in the storage device. At step 112, in response to uploading the file with the modified file name into the storage device, the storage server generates a file link associated with the file. The file link references a location in the storage device where the file is stored. For example, the file link can reference a logical and/or physical storage location in the storage device where the file is stored.

At step 114, the storage server transmits the file link to the client application. At step 116, the client application provides the file link to a recipient. In an exemplary embodiment, the recipient accesses the file link via a user interface generated on a second user device, although in alternative embodiments, the recipient may use the first user device. At step 118, the recipient selects or clicks on the file link. At step 120, the selecting or clicking of the file link prompts the storage server to retrieve the file from the storage device associated with the file link. At step 122, the storage server retrieves the file using the file link and transmits the file to the second user device. At step 124, the second user device opens or launches the file associated with the file link, and the file is displayed on the second user device via the user interface generated on the second user device.

The maintenance storage server is configured to permanently erase a file based on the file name. For example, embodiments of the maintenance storage server can be configured to identify and erase memory locations associated with files having file names that are indicative of the files being stored in the storage device for at least a specified duration of time. At step 126, the maintenance storage server reviews a duration of each file in the storage device by checking the expiration stamp added to the file name by the file. More particularly, the maintenance storage server parses each file name to extract the expiration stamp from the file name to determine whether the specified duration of time has elapsed. At step 128, the maintenance server execute an erase operation to autonomously and permanently erase any file stored in the storage device longer than a predefined duration, for example, thirty days.

In some embodiments, the maintenance storage server is configured to not erase files that include a predefined word or set of letters. For example, if a file name begins with the term "permalink" (for example, permalink filename) the file will not be deleted by the maintenance storage server. In such an embodiment, the maintenance storage server updates the expiration stamp on any files including the predefined word or set of letters to the current date prior to executing the erase operation to permanently erase any files stored in the storage device longer than the predefined duration. Thus, files with the predefined word or set of letters will not be identified as existing longer than the predefined duration. This enables permanent storage of files to coexist with files that are automatically deleted.

Figure 2:
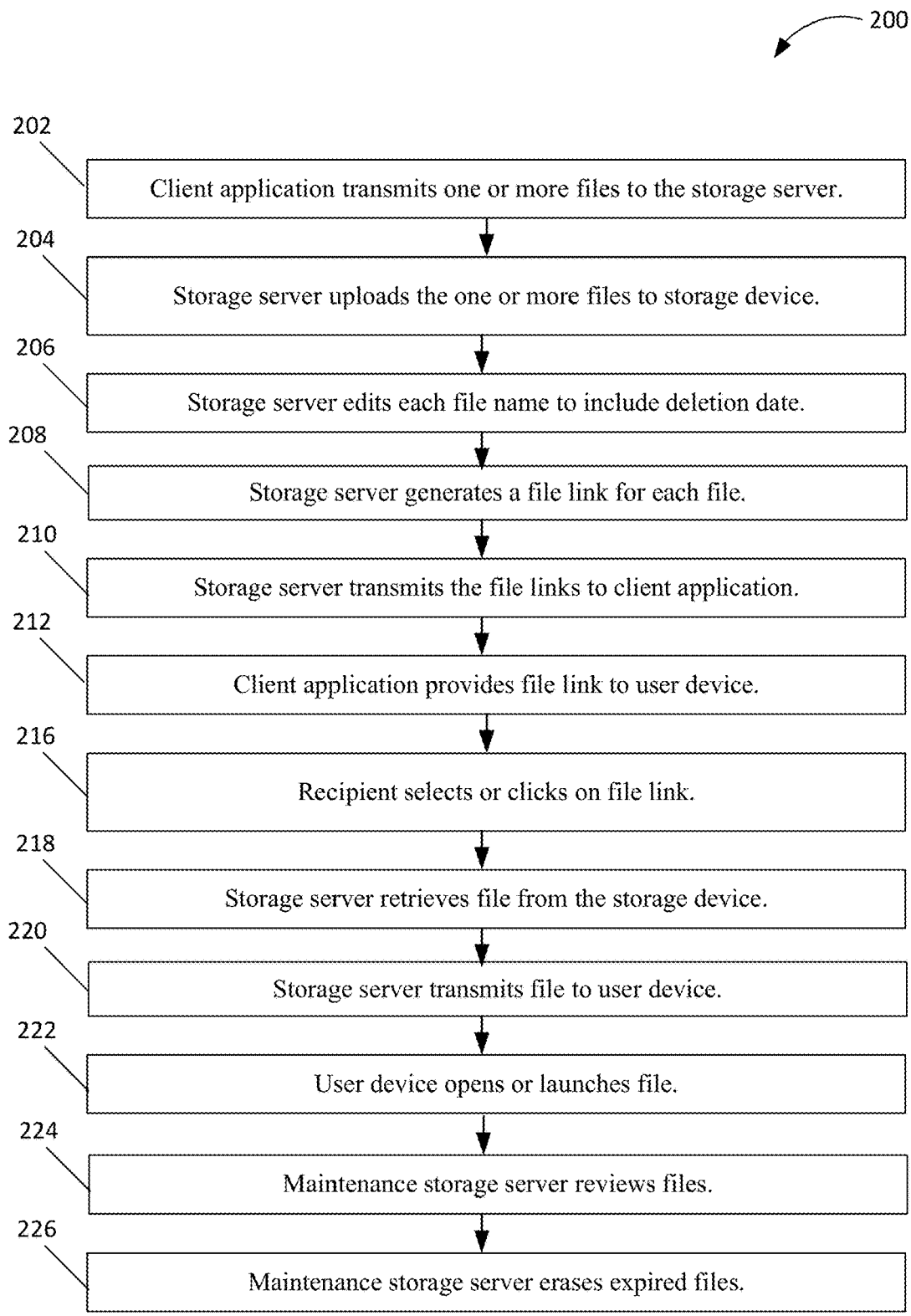
FIG. 2 is a flowchart illustrating another exemplary method for providing self-managing data storage resources provided as a service to a remotely executed application using a specialized computer file system, according to an example embodiment.

FIG. 2 is a flowchart illustrating another exemplary method 200 for providing self-managing data storage resources as a service to a remotely executed application using a specialized computer file system, according to an example embodiment. Method 200 is implemented using a storage server, at least one client application, a data storage using a non-relational data store, and a maintenance storage server.

At step 202, the client application transmits one or more files to the storage server. In some embodiments, the storage server is associated with an application program interface (API), wherein the client application communicates with the storage server using the API. At step 204, a storage server uploads the one or more files to the storage device. Each file is associated with a file name. At step 206, the storage server edits each file name. For example, the storage server can edit the file name to include a deletion date, and/or other information such as an upload date, an alphanumeric marker, and the like. For example, the storage server can add an expiration stamp to the file name associated with a date to delete the file from the storage device and/or an upload time stamp. In one embodiment, the deletion date can be thirty days from a date a file is added to the storage device. At step 208, the storage server generates a file link for each file of the one or more files. At step 210, the storage server transmits the one or more file links to the client application.

At step 212, the client application provides a first file link of the one or more file links to a user device of a recipient, for example, via an email, a text message, near-field communication, and the like. A user interface on the user device displays the first file link. At step 216, the recipient selects or clicks on the first file link. The first file link references a specific file stored in the storage device. At step 218, the selecting or clicking of the first file link prompts the storage server to retrieve a file from the storage device associated with the first file link. At step 220, the storage server transmits the file to the user device. At step 222, the user device opens or launches the file associated with the first file link. The file is displayed on the user device via the user interface generated on the user device.

The maintenance storage server is configured to permanently erase a file that has been stored in the storage device based on the file name. For example, embodiments of the maintenance storage server can be configured to identify and erase memory locations associated with files having file names that are indicative the files being stored in the storage device for at least a specified duration of time. At step 224, the maintenance storage server reviews the file names of the files in the storage device and determines the duration of time that each file in the storage device by checking, e.g., expiration stamps added to the file name by the storage server. At step 226, the maintenance storage server permanently erases any file stored in the storage device for at least the specified duration of time, for example, thirty days.

Figure 3:
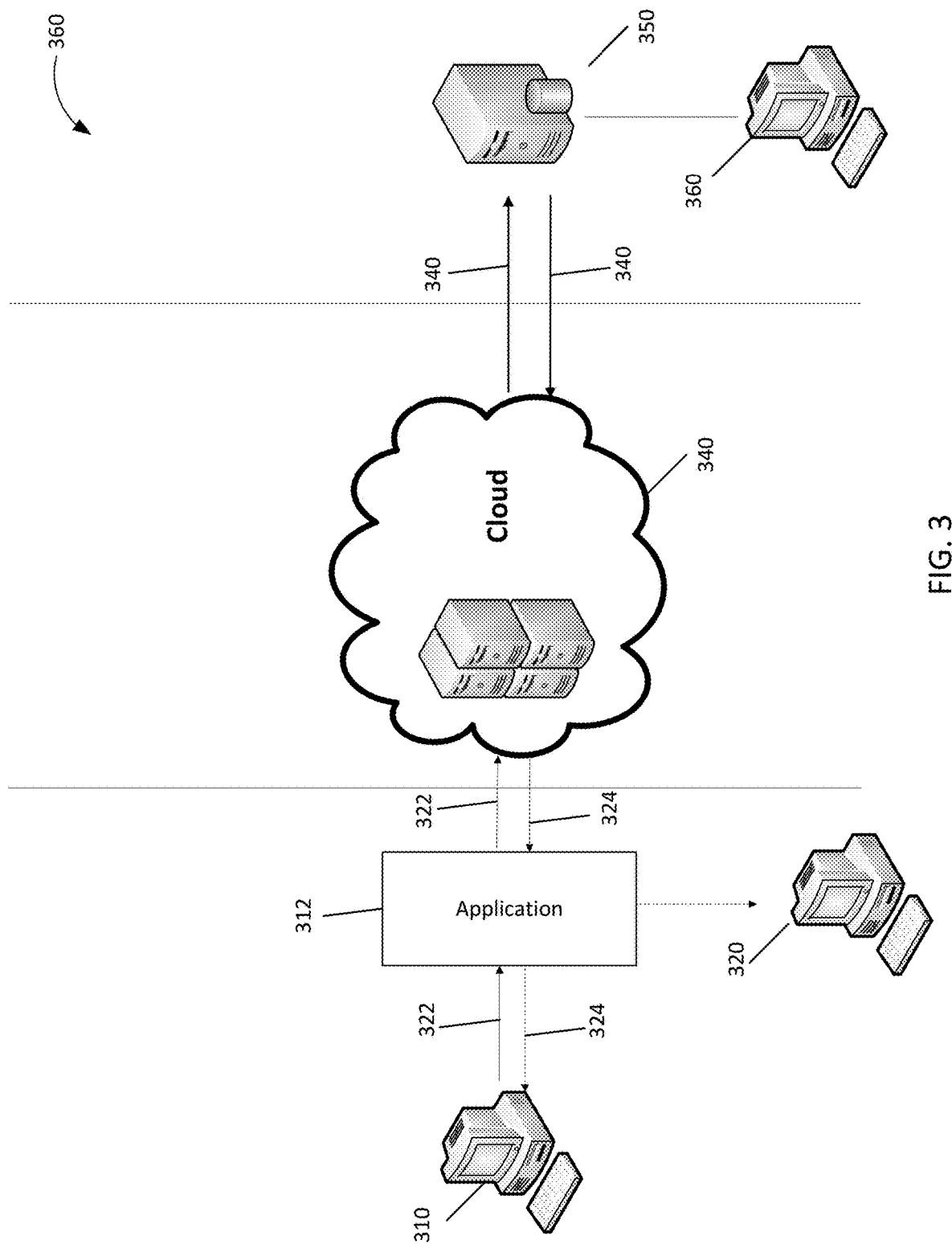
FIG. 3 depicts an example system for providing self-managing data storage resources provided as a service to a remotely executed application using a specialized computer file system, according to an example embodiment.

FIG. 3 depicts an exemplary system 300 for providing self-managing data storage resources as a service to a remotely executed application using a specialized computer file system, according to example embodiments. System 300 includes a storage server 340, a storage device 350, a maintenance storage server 360, and multiple user devices, for example, a first user device 310 and a second user device 320. At least one user device includes a client application 312. In some embodiments, client application 312 is a web-based application or a mobile application. In additional embodiments, client application 312 is storage server-based application deployed in an internal company network. In such an embodiment, a file link may be a file path within the internal company network.

In one embodiment, storage server 340 and storage device 350 may be implemented as a cloud computing system where storage server 340 is a central cloud server. Files transmitted for upload to storage device 350 and file requests from user device 310 may be routed to the central cloud server.

In one embodiment, data stored in storage device 350 may be replicated across multiple storage servers 340 and redundant across multiple storage devices 350. In an exemplary embodiment, the specialized computer file system utilizes a Tomcat Farm and a storage-area network (SAN). The SAN is a dedicated high-speed network that interconnects and presents shared pools of storage devices 350 to multiple storage servers 340. The specialized computer file system may be replicated across n number of storage servers 340 and redundant across n number of storage devices 350. In some embodiments, J2EE may be used to upload and retrieve stored files from storage device 350. For example, J2EE may be used to save files and file links to storage device 350 and also used to retrieve files and file links from storage device 350.

As described above, a user can access client application 312 via first user device 310. A user selects at least one file identified by a file name using first user device 310. Client application 312 transmits 322 the file to storage server 340. Storage server 340 stores the file into storage device 350. In one embodiment, the file is stored in a directory associated with user credentials used by the user to log into client application 312. Storage server 340 is further configured to modify the file name to include an expiration stamp or other marker before the data file is stored in storage device 350. As an example, the expiration stamp can be associated with a deletion date for the file and/or an upload date of the file.

In response to storing the file into storage device 350, storage server 340 generates a file link associated with the file. In an exemplary embodiment, storage server 340 transmits 324 the file link back to client application 312 on first user device 310. Client application 312 may then transmit the file link to a first recipient using first user device 310 or a different user device, such as to a second recipient using a second user device 320. For example, client application 312 may use an electronic messaging standard such as email to transmit the file link to, for example, second user device 320. The second recipient using second user device 320 may then select the file link to access the file. Upon selecting the file link, storage server 340 retrieves the file associated with the file link from storage device 350. Storage server 340 transmits the file to second user device 320, which then may be opened and/or viewed by the second recipient. In another embodiment, storage server 340 transmits the file link to a different remote location identified by client application 312. For improved security, the file is irretrievable by users by any other means than using the file link.

Maintenance storage server 360 is coupled to storage device 350 and is configured to run a scheduled task to identify and erase files based on the file names of the file and/or in response to determining that the files are older than a specified duration. In an exemplary embodiment, maintenance storage server 360 identifies outdated files based on an expiration stamp added to the file name by storage server 340. Maintenance storage server 360 parses each file name to extract the expiration stamp from the file name and determine whether the specified duration of time has elapsed. Maintenance storage server 360 is configured to then execute an erase operation to autonomously erase any expired files from storage device 350.

In some embodiments, the user interface of client application 312 displays a graphical control element indicating files stored in storage device 350. As a non-limiting example, the graphical control element indicating the files stored in storage device 350 may be a list that is dynamically updated based on additions and deletions of files. In some embodiments, the user interface of client application 312 includes an input control button that when selected communicates with storage server 340 to delete a file from storage device 350. Thus, the user is able to manually clear files from storage device 350 when he or she desires.

In additional embodiments, storage server 340 is configured to generate logs for reporting file activity within a predefined duration (i.e., the last 12 months of activity). For example, storage server 340 may be configured to store in a log attempted or successful writes or deletions of files in storage device 350, files stored in a directory, files deleted within the predefined duration, time and dates of file writes and deletions, type of activity, and files being accessed.

Figure 4:
FIG. 4 illustrates an example user interface for uploading files by a user to the specialized computer file system, according to an example embodiment.

FIG. 4 illustrate an exemplary user interface 405 for the specialized computer file system, according to an example embodiment. Exemplary user interface 405 may be generated on a user device (e.g., user device 310 shown in FIG. 2). Exemplary user interface 405 includes an input field 407 and a notification field 410. A user uses input field 407 to upload a file by right clicking the file and clicking a menu item called, for example, "Create 30 Day File Link." In response to clicking input field 407, a client application (e.g., client application 312 shown in FIG. 2) transmits or routes the file to a storage server (e.g., storage server 340 shown in FIG. 2). The storage server uploads the file into a storage device (e.g., storage device 350 shown in FIG. 2) and generates a file link that may be copied in a clipboard, as shown in notification field 410. The file link is active for a predefined duration (e.g., 30 days). The user can, for example, cut and past the link into an email. After the predefined duration, the file is permanently deleted from the storage device and the file link will not return the file.

In one embodiment, user credentials are used as a file directory in the storage device. If the client application provides a username and/or a password, the storage server may store and retrieve file links and/or files using the directory in the storage device. For example, a user's stored file links and/or files may be retrieved from the directory using the username and/or the password. In an alternative embodiment, the files are retrievable in the storage device based on a file name. The user and/or client application does not need to supply user credentials to the storage server in order for the storage server to store a file in the storage device, generate a file link, and/or retrieve the file from the storage device.

Figure 5:
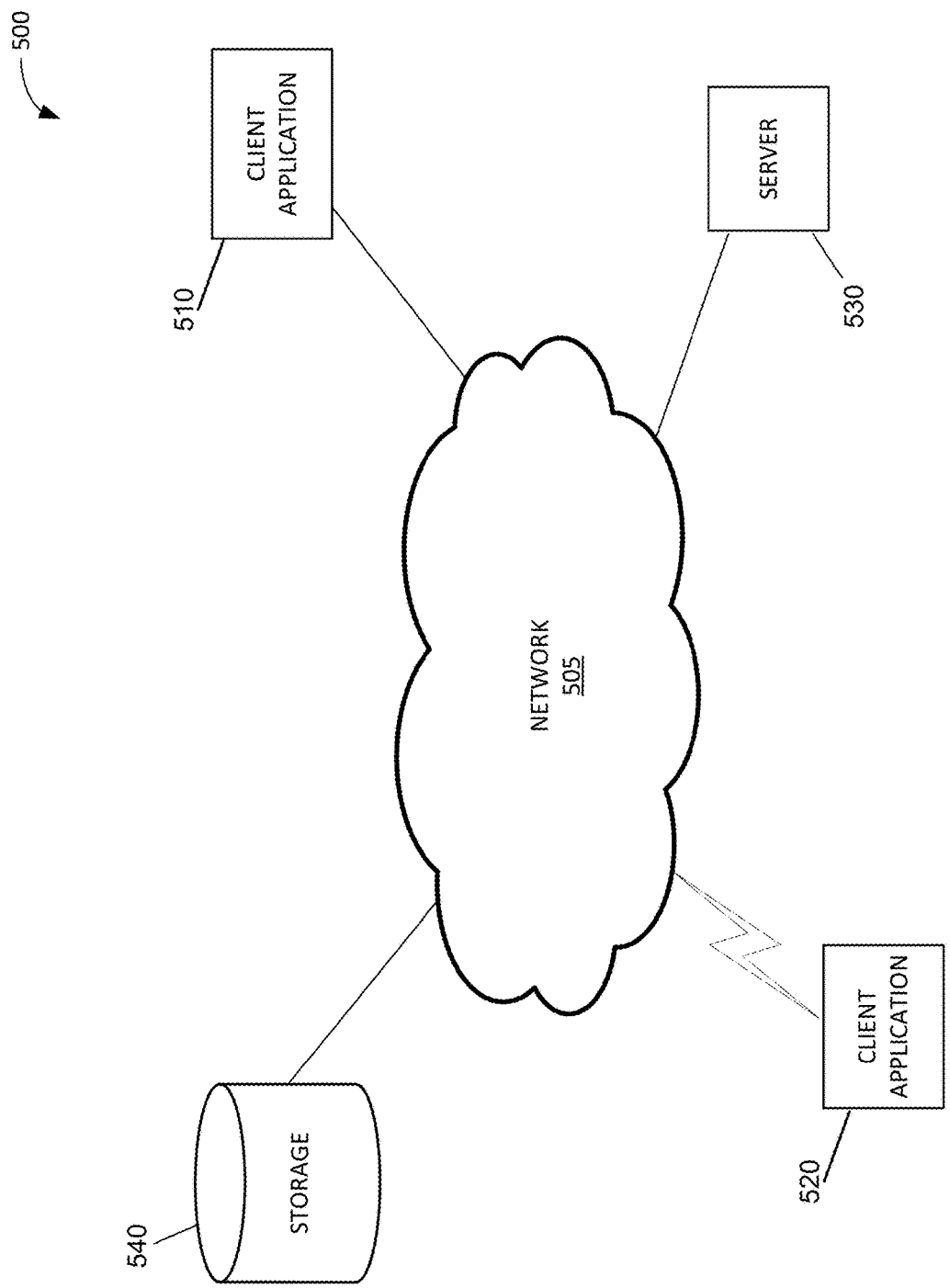
FIG. 5 is a diagram of an exemplary network environment suitable for an implementation of the specialized computer file system, according to an example embodiment.

FIG. 5 illustrates a network diagram depicting a system 500 for implementing the specialized computer file system, according to an example embodiment. System 500 includes a network 505, multiple user devices, for example, client application 510, client application 520, at least one storage server 530, and at least one storage device 540. Client application 510, 520, storage server 530, and storage device 540 are in communication with network 505.

In an example embodiment, one or more portions of network 505 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks. In one embodiment, the specialized computer file system may be implemented for a corporation using its intranet or an internal network.

Client application 510, 520 may be associated with or installed on, but are not limited to, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, network PCs, mini-computers, and the like. Each of client application 510, 520 may connect to network 505 via a wired or wireless connection. Each of client application 510, 520, may include one or more applications such as, but not limited to, a web browsing application (e.g., browser 615a of computing device 600a shown in FIG. 6A) and/or a mobile application to enable access to the specialized computer file system described herein.

Storage device 540 and storage server 530 are connected to network 505 via a wired connection. Alternatively, storage device 540 and storage server 530 may be connected to network 505 via a wireless connection. Storage server 530 comprise one or more computers or processors configured to communicate with client application 510, 520 via network 505. Storage server 530 can include one or more components of storage server 600b of FIG. 6B.

Client application 510, 520 hosts one or more applications or websites accessed by storage server 530. Storage device(s) 540 comprise one or more storage devices for storing files and/or data retrievable by storage server 530. Storage device(s) 540 and storage server 530 may be located at one or more geographically distributed locations from each other or from client application 510, 520. Alternatively, storage device(s) 540 may be included within storage server 530.

Figure 6A:
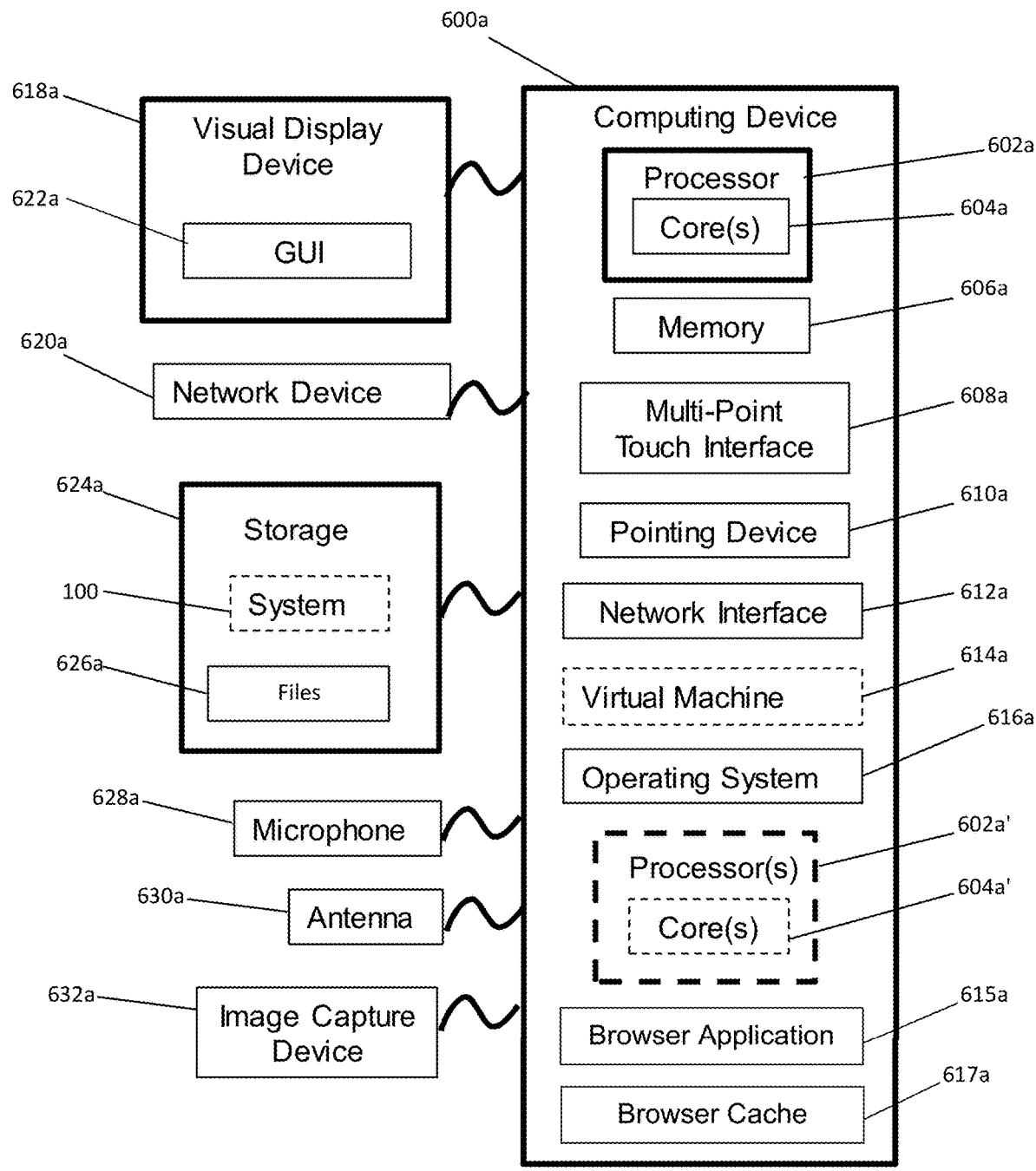
FIG. 6A is a block diagram of an exemplary computing device that may be used to implement exemplary embodiments described herein.

FIG. 6A is a block diagram of an exemplary computing device 600a that can be used to perform one or more steps of the methods provided by exemplary embodiments. In an exemplary embodiment, computing device 600a is a storage server and/or a user device. Computing device 600a includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more USB flashdrives), and the like. For example, a memory 606a included in computing device 600a can store computer-readable and computer-executable instructions or software for implementing exemplary embodiments. Computing device 600a also includes a processor 602a and an associated core 604a, and optionally, one or more additional processor(s) 602a' and associated core(s) 604a' (for example, in the case of computer systems having multiple processors/cores), for executing computer-readable and computer-executable instructions or software stored in memory 606a and other programs for controlling system hardware. Processor 602a and processor(s) 602a' can each be a single core processor or multiple core (604a and 604a') processor.

Computing device 600a may include a browser application 615 and a browser cache 617a. As described above, browser application 615a can enable a user to select files and/or file links, and receive a file.

Virtualization can be employed in computing device 600a so that infrastructure and resources in the computing device can be shared dynamically. A virtual machine 614a can be provided to handle a process running on multiple processors so that the process appears to be using only one computing resource rather than multiple computing resources. Multiple virtual machines can also be used with one processor.

Memory 606a can include a computer system memory or random access memory, such as DRAM, SRAM, EDO RAM, and the like. Memory 606a can include other types of memory as well, or combinations thereof. In some embodiments, a user can interact with computing device 600a through a visual display device 618a, such as a touch screen display or computer monitor, which can display one or more user interfaces 619a that can be provided in accordance with exemplary embodiments, for example, the exemplary user interfaces illustrated in FIG. 4. Visual display device 618a may also display other aspects, elements and/or information or data associated with exemplary embodiments. Computing device 600a may include other I/O devices for receiving input from a user, for example, a keyboard or any suitable multi-point touch interface 608a, a pointing device 610a (e.g., a pen, stylus, mouse, or trackpad). The keyboard 608a and pointing device 610a may be coupled to visual display device 618a. Computing device 600a may include other suitable conventional I/O peripherals.

Computing device 600a can also include one or more storage devices 624a, such as a hard-drive, CD-ROM, or other computer readable media, for storing data and computer-readable instructions and/or software, that implements embodiments of the specialized computer file system, as described herein, or portions thereof. Exemplary storage device 624a can also store one or more storage devices for storing any suitable information required to implement exemplary embodiments.

Computing device 600a can include a network interface 612a configured to interface via one or more network devices 622a with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 612a can include a built-in network adapter, network interface card, PCMCIA network card, card bus network adapter, wireless network adapter, USB network adapter, modem or any other device suitable for interfacing computing device 600a to any type of network capable of communication and performing the operations described herein. Moreover, computing device 600a can be any computer system, such as a workstation, desktop computer, storage server, laptop, hand-held computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

Computing device 600a can run any operating system 616a, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 616a can be run in native mode or emulated mode. In an exemplary embodiment, the operating system 616a can be run on one or more cloud machine instances.

Figure 6B:
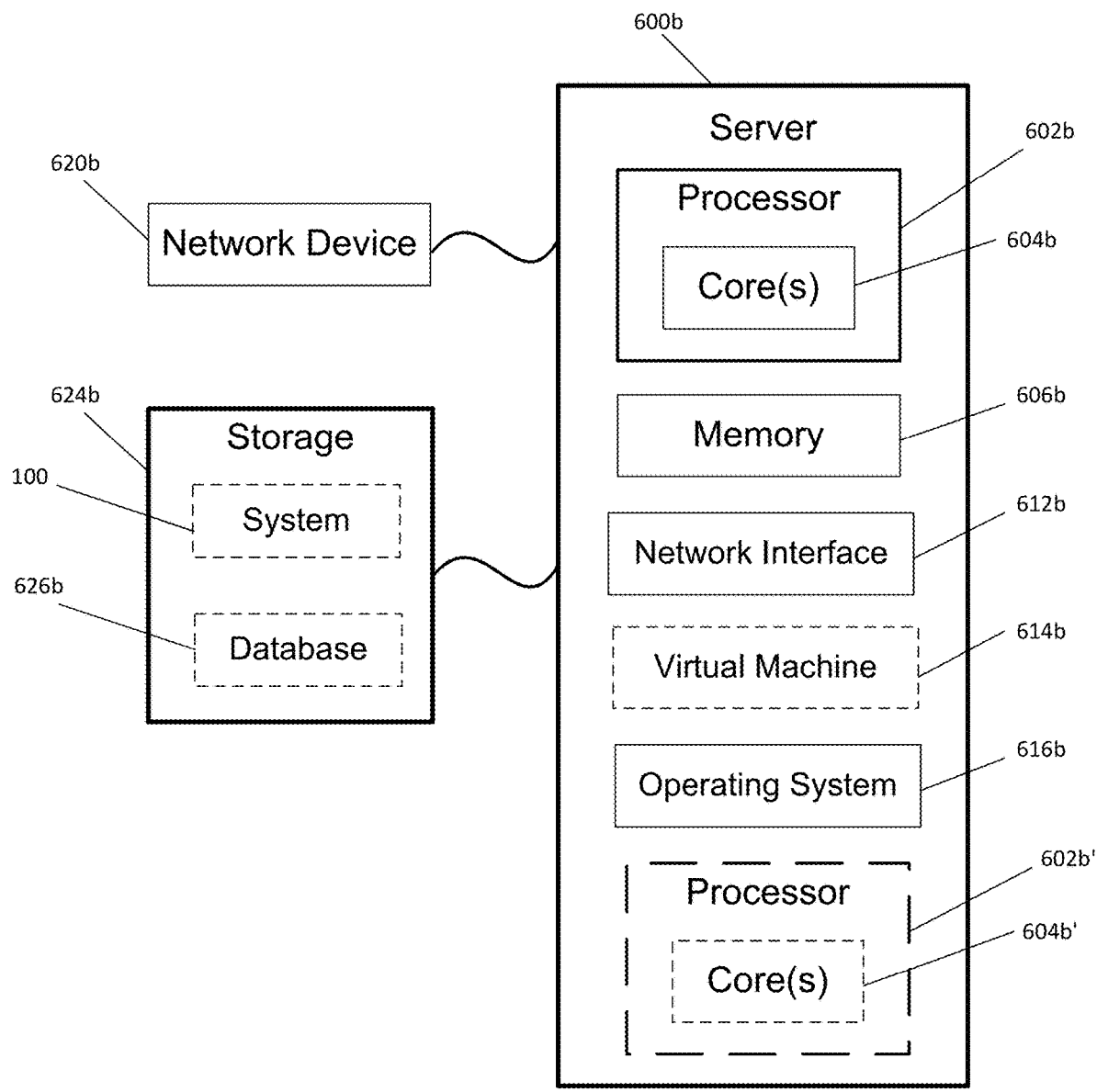
FIG. 6B is a block diagram of an exemplary storage server that may be used to implement exemplary embodiments described herein.

FIG. 6B is a block diagram of an exemplary storage server 600b that can be used to perform one or more steps of the methods provided by exemplary embodiments. Storage server 600b includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more USB flashdrives), and the like. For example, memory 606b included in storage server 600b can store computer-readable and computer-executable instructions or software for implementing exemplary embodiments. Storage server 600b also includes processor 602b and associated core 604b, and optionally, one or more additional processor(s) 602b' and associated core(s) 604b' (for example, in the case of computer systems having multiple processors/cores), for executing computer-readable and computer-executable instructions or software stored in memory 606b and other programs for controlling system hardware. Processor 602b and processor(s) 602b' can each be a single core processor or multiple core (604b and 604b') processor.

Virtualization may be employed in storage server 600b so that infrastructure and resources in the storage server can be shared dynamically. A virtual machine 614b can be provided to handle a process running on multiple processors so that the process appears to be using only one computing resource rather than multiple computing resources. Multiple virtual machines can also be used with one processor.

Memory 606b can include a computer system memory or random access memory, such as DRAM, SRAM, EDO RAM, and the like. Memory 606b can include other types of memory as well, or combinations thereof.

Storage server 600b can also include or be coupled to one or more storage devices 624b for storing files to implement exemplary embodiments of the specialized computer file system as described herein, or portions thereof. Storage devices 624a enables adding and deleting one or more files 626a in storage.

Storage server 600b can include a network interface 612b configured to interface via one or more network devices 622b with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. Network interface 612b can include a built-in network adapter, network interface card, PCMCIA network card, card bus network adapter, wireless network adapter, USB network adapter, modem or any other device suitable for interfacing storage server 600b to any type of network capable of communication and performing the operations described herein. Moreover, storage server 600b can be any computer system, such as a workstation, desktop computer, storage server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

Storage server 600b can run any operating system 616b, such as any of the versions of the Microsoft® Windows® operating systems, the different releases of the Unix and Linux operating systems, any version of the MacOS® for Macintosh computers, any storage server operating systems, any embedded operating system, any real-time operating system, any open source operating system, any proprietary operating system, any operating systems for mobile computing devices, or any other operating system capable of running on the computing device and performing the operations described herein. In exemplary embodiments, operating system 616b can be run in native mode or emulated mode. In an exemplary embodiment, operating system 616b can be run on one or more cloud machine instances.

The following description is presented to enable any person skilled in the art to create and use a computer system configuration and related method and systems for improving access to electronic data. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps can be replaced with a single element, component or step. Likewise, a single element, component or step can be replaced with a plurality of elements, components or steps that serve the same purpose. Moreover, while exemplary embodiments have been shown and described with references to particular embodiments thereof, those of ordinary skill in the art will understand that various substitutions and alterations in form and detail can be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods can include more or fewer steps than those illustrated in the exemplary flowcharts, and that the steps in the exemplary flowcharts can be performed in a different order than the order shown in the illustrative flowcharts.

What is claimed is:

1. A specialized computer file system for self-managing data storage resources provided as a service to remotely executed applications, the system comprising:
   a data storage device configured to store a plurality of data files in a non-relational data store;
   a storage server communicatively coupled to the data storage device and a client application, the storage server configured to:
      receive at least one data file from the client application, wherein the at least one data file is associated with a file name;
      modify the file name to include an expiration stamp before the at least one data file is stored in the data storage device, the expiration stamp associated with a deletion date or an upload date of the file;
      upload the at least one data file to the data storage device to be stored with the plurality of data files;
      generate a file link associated with the at least one data file, the file link including a source path to the at least one data file stored in the data storage device; and
      transmit the file link to the client application, wherein the client application transmits the file link to an end user via at least one of an email or a text message and the at least one data file is retrievable by the end user via the file link; and
   a maintenance server communicatively coupled to the data storage device, the maintenance server configured to:
      execute an erase operation to autonomously erase the at least one data file from the data storage device after the data file has been stored in the data storage device for a specified duration of time based on the expiration stamp.

2. The system of claim 1, wherein the storage server is further configured to:
- receive a request for the at least one data file from a user device, the request initiated by the end user via the file link;
- retrieve the at least one data file from the data storage device; and
- transmit the at least one data file to the end user.

3. The system of claim 1, wherein the storage server and the data storage device are associated with a storage-area network (SAN).

4. The system of claim 1, wherein the storage server is associated with a Tomcat server farm connected to a plurality of data storage devices.

5. The system of claim 1, wherein the storage server is associated with an application program interface (API), wherein the client application communicates with the storage server using the API.

6. The system of claim 1, wherein the storage server is further configured to transmit log files associated with the plurality of data files to the client application.

7. The system of claim 1, wherein the maintenance server is configured to parse the file name to extract the expiration stamp from the file name and is configured to determine whether the specified duration of time has elapsed.

8. The system of claim 1, wherein the at least one data file is irretrievable without the file link.

9. A method for self-managing data storage provided as a service to remotely executed applications, the method implemented via a data storage device configured to store a plurality of data files in a non-relational data store, a storage server communicatively coupled to the data storage device and a client application, and a maintenance server communicatively coupled to the data storage device, the method comprising:
- receiving, by the storage server, at least one data file from the client application, wherein the at least one data file is associated with a file name;
- modifying, by the storage server, the file name to include an expiration stamp before the at least one data file is stored in the data storage device, the expiration stamp associated with a deletion date or an upload date of the file;
- uploading, by the storage server, the at least one data file to the data storage device to be stored with the plurality of data files;
- generating, by the storage server, a file link associated with the at least one data file, the file link including a source path to the at least one data file stored in the data storage device;
- transmitting, by the storage server, the file link to the client application, wherein the client application transmits the file link to an end user via at least one of an email or a text message and the at least one data file is retrievable by the end user via the file link; and
- executing, by the maintenance server, an erase operation to autonomously erase the at least one data file from the data storage device after the data file has been stored in the data storage device for a specified duration of time based on the expiration stamp.

10. The method of claim 9, further comprising:
- receiving, by the storage server, a request for the at least one data file from a user device, the request initiated by the end user via the file link;
- retrieving, by the storage server, the at least one data file from the data storage device; and
- transmitting, by the storage server, the at least one data file to the end user.

11. The method of claim 9, wherein the storage server and the data storage device are associated with a storage-area network (SAN).

12. The method of claim 9, wherein the storage server is associated with a Tomcat server farm connected to a plurality of data storage devices.

13. The method of claim 9, wherein the storage server is associated with an application program interface (API), wherein the client application communicates with the storage server using the API.

14. The method of claim 9, wherein the storage server is further configured to transmit log files associated with the plurality of data files to the client application.

15. The method of claim 9, further comprising:
- parsing, by the maintenance server, the file name to extract the expiration stamp from the file name; and
- determining, by the maintenance server, whether the specified duration of time has elapsed.

16. The method of claim 9, wherein the at least one data file is irretrievable without the file link.

17. A non-transitory computer-readable medium storing instructions for self-managing data storage provided as a service to remotely executed applications that when executed:
- receives, by a storage server, at least one data file from a client application, wherein the at least one data file is associated with a file name;
- modifying, by the storage server, the file name to include an expiration stamp before the at least one data file is stored in the data storage device, the expiration stamp associated with a deletion date or an upload date of the file; and
- uploads, by the storage server, the at least one data file to a data storage device configured to store a plurality of data files in a non-relational data store, wherein the at least one data file is stored with the plurality of data files;
- generates, by the storage server, a file link associated with the at least one data file, the file link including a source path to the at least one data file stored in the data storage device;
- transmits, by the storage server, the file link to the client application, wherein the client application transmits the file link to an end user via at least one of an email or a text message and the at least one data file is retrievable by the end user via the file link; and
- executes, by a maintenance server, an erase operation to autonomously erase the at least one data file from the data storage device after the data file has been stored in the data storage device for a specified duration of time based on the expiration stamp.

18. The non-transitory computer readable medium of claim 17, further comprising:
- receiving, by the storage server, a request for the at least one data file from a user device, the request initiated by the end user via the file link;
- retrieving, by the storage server, the at least one data file from the data storage device; and
- transmitting, by the storage server, the at least one data file to the end user.

19. The non-transitory computer readable medium of claim 17, wherein the storage server and the data storage device are associated with a storage-area network (SAN).

20. The non-transitory computer readable medium of claim 17, wherein the storage server is associated with a Tomcat server farm connected to a plurality of data storage devices.

21. The non-transitory computer readable medium of claim 17, wherein the storage server is associated with an application program interface (API), wherein the client application communicates with the storage server using the API.

22. The non-transitory computer readable medium of claim 17, further comprising transmitting, by the storage server, log files associated with the plurality of data files to the client application.

23. The non-transitory computer readable medium of claim 17, further comprising:
    parsing, by the maintenance server, the file name to extract the expiration stamp from the file name; and
    determining, by the maintenance server, whether the specified duration of time has elapsed.

24. The non-transitory computer readable medium of claim 17, wherein the at least one data file is irretrievable without the file link.

\* \* \* \* \*